United States Patent
Cullman et al.

(10) Patent No.: US 10,819,252 B2
(45) Date of Patent: Oct. 27, 2020

(54) ADAPTIVE HYBRID WIRELESS POWER GENERATION USING PIEZOELECTRIC ELEMENT AND POWER BEAMING IN HYDRAULIC SYSTEMS

(71) Applicant: Parker-Hannifin Corporation, Cleveland, OH (US)

(72) Inventors: Jeff Cullman, Wadsworth, OH (US); Hao Zhang, Twinsburg, OH (US); James Howland, Aurora, CO (US); Zhesheng Jiang, Solon, OH (US); Nicholas White, Arlington Heights, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/609,541

(22) PCT Filed: Apr. 19, 2018

(86) PCT No.: PCT/US2018/028314
§ 371 (c)(1),
(2) Date: Oct. 30, 2019

(87) PCT Pub. No.: WO2018/204082
PCT Pub. Date: Nov. 8, 2018

(65) Prior Publication Data
US 2020/0067428 A1 Feb. 27, 2020

Related U.S. Application Data

(60) Provisional application No. 62/500,531, filed on May 3, 2017.

(51) Int. Cl.
*H02N 2/18* (2006.01)
*H02J 50/20* (2016.01)
(Continued)

(52) U.S. Cl.
CPC .............. *H02N 2/185* (2013.01); *H02J 7/32* (2013.01); *H02J 50/20* (2016.02); *H02N 2/181* (2013.01); *G01D 11/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,666,976 A | * | 5/1972 | Gourlay | H02N 2/185 310/324 |
| 2006/0027400 A1 | * | 2/2006 | Garcia | H02N 2/186 175/320 |
| 2008/0234902 A1 | * | 9/2008 | Johnson | E02F 3/422 701/50 |

FOREIGN PATENT DOCUMENTS

WO    WO 2014/197712 A1    12/2014

OTHER PUBLICATIONS

International Search Report and Written Opinion of PCT/US2018/028314 dated Jul. 2, 2018.

* cited by examiner

Primary Examiner — Daniel Kessie
(74) Attorney, Agent, or Firm — Renner, Otto, Boisselle & Sklar, LLP

(57) ABSTRACT

A device, system and method for harvesting electrical power from hydraulic fluid of a hydraulic system determines at least one of hydraulic fluid flow or hydraulic fluid pressure in the hydraulic system. Based on rules and the determined at least one of the hydraulic fluid flow or hydraulic fluid pressure, an expected conversion efficiency of the power conversion device and an expected rectified power to be generated from the received input power by the power conversion device are determined. From the expected rectified power a potential conversion efficiency of the power (Continued)

conversion device is determined, and the power conversion device is commanded to produce the expected rectified power when the potential conversion efficiency is greater than or equal to the expected conversion efficiency. When the potential conversion efficiency is less than the expected conversion efficiency, the rules are updated.

19 Claims, 6 Drawing Sheets

(51) Int. Cl.
*H02J 7/32* (2006.01)
*G01D 11/00* (2006.01)

ADAPTIVE HYBRID WIRELESS POWER GENERATION USING PIEZOELECTRIC ELEMENT AND POWER BEAMING IN HYDRAULIC SYSTEMS

RELATED APPLICATION DATA

This application is a national stage application pursuant to 35 U.S.C. § 371 of PCT/US2018/028314 filed on Apr. 19, 2018, which claims the benefit of U.S. Provisional Application No. 62/500,531 filed May 3, 2017, the contents of which are incorporated herein by reference.

FIELD OF INVENTION

The present invention relates generally to power generation, and more particularly to power generation using piezoelectric elements in hydraulic systems.

BACKGROUND

The Internet of Things (IoT) is expected to offer advanced connectivity of devices, systems, and services that go beyond machine-to-machine communications and covers a variety of protocols, domains, and applications. Due to a convergence of multiple technologies, ranging from wireless communication to the Internet and from embedded systems to micro-electromechanical systems (MEMS), IoT has significantly evolved. The traditional fields of embedded systems, wireless sensor networks, control systems, automation (including home and building automation), and others, all have contributions that enable the Internet of Things. In enabling the Internet of Things, wireless sensors play an important role in industrial applications including hydraulic systems.

Electric power for various devices can be generated from other devices or even from the ambient environment. For example, a voltage generator is typically used to convert non-electrical energy to electrical energy. The non-electrical energy could be mechanical energy, solar energy, kinetic energy, or thermal energy but rarely hydraulic energy. An energy store such as a capacitor is typically utilized to store the generated electrical energy, and the electrical energy can be provided to one or more sensors. A transmitter then can be used for wireless transmission of messages, which could be in the form of low-power radio signals. Alternatively, power may be transmitted via a wired connection.

Energy can be derived from external sources (e.g., solar energy, thermal energy, wind energy, salinity gradients, and kinetic energy), captured and stored for small, wireless autonomous devices such as wireless sensor networks developed using MEMS technology. This process is known as energy harvesting. The motivation for such technology has been elimination of the maintenance required to replace batteries, elimination of the chemical waste associated with conventional batteries, elimination of wiring, long lasting operability, enabling the installation of sensors in remote or difficult to access areas, etc. The common devices for energy conversion employ a piezoelectric beam or membrane, an electroactive polymer, or an inductive coil and magnet arrangement. A piezoelectric element is one of the most commonly used devices for energy conversion.

Fluid flow contains hydraulic power which can be converted to electric power via energy harvesting. At the macro scale, the use of wind turbines is becoming more common. For sensor networks, due to viscosity effects more novel approaches are required at the required scale. To perform some long endurance military missions, small and unattended sensors must generate and harvest power from their surroundings. Even for some industrial and mobile applications such as structural health monitoring, wireless power generation is also very useful.

Fluid flow in a hydraulic system can be directly converted to electric power. Fluid flow may also generate mechanical vibrations, pressure variations/ripples, and/or thermal differences, each of which also can be used to harvest energy by means of different approaches.

In recent years, research has been done on harvesting pressure variations or ripples in hydraulic systems, particularly high-pressure variations. It is reported that such a pressure ripple energy harvesting prototype provided a maximum output of 1.2 mW at 120Ω. However, such an energy harvester has several disadvantages: it normally works for a high-pressure hydraulic system and needs large pressure variations that a healthy hydraulic system would not like to see; it might need a direct-force device to harvest pressure ripple energy which results in the size increase of a piezoelectric transducer and less flexibility of the transducer installation; and the energy harvesting efficiency is not clear although the energy density of a hydraulic system is high.

SUMMARY OF INVENTION

Since thermal energy harvesting has a very low efficiency (much less than 40% of the Carnot efficiency), it is not practical to harvest it at a micro scale. At a micro scale, a piezoelectric material might be the best candidate to harvest mechanical energy including fluid flow and vibrations. The reasons include that piezoelectric transduction does not need an external voltage source, has high voltages of 2~10 V and a compact configuration, is compatible with MEMS and has high coupling in single crystals. Among those, the high voltage with no additional voltage source is the most important as a typical sensor needs a power source with a voltage of 5~10 V.

According to the present invention, through a piezoelectric element, hydraulic flow, pressure and/or vibrations due to hydraulic flow are used to generate electric power for use by one or more sensors. An adaptive learning system controls power generation based on a state of the system (e.g., based on flow rate, pressure) using a rule-based scheme. By using rules based on system state, energy conversion efficiency is optimized resulting in increased power harvested from the hydraulic system.

According to another aspect of the invention, a method for harvesting electrical power from hydraulic fluid of a hydraulic system, wherein a power conversion device receives input power generated from the hydraulic fluid includes: determining at least one of hydraulic fluid flow or hydraulic fluid pressure in the hydraulic system; determining, based on rules and the determined at least one of the hydraulic fluid flow or hydraulic fluid pressure, an expected conversion efficiency of the power conversion device and an expected rectified power to be generated from the input power received by the power conversion device; determining from the expected rectified power a potential conversion efficiency of the power conversion device; commanding the power conversion device to produce the expected rectified power when the potential conversion efficiency is greater than or equal to the expected conversion efficiency; and updating the rules when the potential conversion efficiency is less than the expected conversion efficiency.

Optionally, updating the rules comprises at least one of changing the expected conversion efficiency of the power conversion device, changing an expected rectified voltage output by the power conversion device, or changing an expected rectified current output by the power conversion device.

Optionally, the potential conversion efficiency comprises a ratio of the potential rectified power and the input power provided to the conversion device.

Optionally, determining the potential rectified power comprises determining an expected rectified current and an expected rectified voltage, and calculating the expected rectified power from the product of the expected rectified current and the expected rectified voltage.

Optionally, the method includes upon a time period over which electrical power is being harvested exceeding a prescribed harvest time threshold, providing the harvested power to another device.

Optionally, the method includes: determining a harvest time in which power harvesting is active; continuing power harvesting while the harvest time is less than a prescribed harvest threshold time; and stopping power harvesting when the harvest time is greater than the prescribed harvest threshold time.

Optionally, the method includes using a piezoelectric element to generate the input power.

Optionally, the input power is generated from at least one of hydraulic fluid pressure variations, hydraulic fluid flow variations, or vibrations caused by hydraulic fluid flow.

Optionally, the method includes wirelessly transmitting the electrical power to another device.

Optionally, the another device comprises at least one sensor.

Optionally, the at least one sensor comprises a displacement sensor, a pressure sensor or a flow sensor.

According to another aspect of the invention, a controller for harvesting electrical power from hydraulic fluid of a hydraulic system, wherein a power conversion device receives input power generated from the hydraulic fluid, the controller includes: a processor and memory; and logic stored in the memory and executable by the processor, the logic including logic configured to determine at least one of hydraulic fluid flow or hydraulic fluid pressure in the hydraulic system; logic configured to determine, based on rules and the determined at least one of the hydraulic fluid flow or hydraulic fluid pressure, an expected conversion efficiency of the power conversion device and an expected rectified power to be generated from the received input power by the power conversion device; logic configured to determine from the expected rectified power a potential conversion efficiency of the power conversion device; logic configured to command the power conversion device to produce the expected rectified power when the potential conversion efficiency is greater than or equal to the expected conversion efficiency; and logic configured to update the rules when the potential conversion efficiency is less than the expected conversion efficiency.

Optionally, the logic configured to update the rules comprises logic configured to at least one of change the expected conversion efficiency of the power conversion device, change an expected rectified voltage output by the power conversion device, or change an expected rectified current output by the power conversion device.

Optionally, the potential conversion efficiency comprises a ratio of the potential rectified power and the input power provided to the conversion device.

Optionally, the logic configured to determine the potential rectified power comprises logic configured to determine an expected rectified current and an expected rectified voltage, and calculate the expected rectified power from the product of the expected rectified current and the expected rectified voltage.

Optionally, the controller includes logic configured to provide the harvested power to another device upon a time period over which electrical power is being harvested exceeding a prescribed harvest time threshold.

Optionally, the controller includes logic configured to determine a harvest time in which power harvesting is active; logic configured to continue power harvesting while the harvest time is less than a prescribed harvest threshold time; and logic configured to stop power harvesting when the harvest time is greater than the prescribed harvest threshold time.

According to another aspect of the invention, a system for harvesting electrical power from hydraulic fluid of a hydraulic system includes: a power conversion device for converting AC power to DC power; the controller described herein operatively coupled to the power conversion device; and at least one piezoelectric element electrically coupled to the power conversion device and couplable to a hydraulic system, wherein the piezoelectric device generates electric power from fluid flow in the hydraulic system.

Optionally, the system includes at least one sensor configured to receive electric power harvested from the hydraulic system.

The foregoing and other features of the invention are hereinafter described in greater detail with reference to the accompanying drawings.

DETAILED DESCRIPTION

Fluid flow contains hydraulic power which can be converted to electric power. A device and method in accordance with the present invention can generate electric power from hydraulic fluid flow via energy harvesting. More particularly, harvesting devices, such as piezoelectric elements, can be coupled to a hydraulic system in order to generate power via pressure ripple, pressure flow and/or turbulence within the hydraulic flow (e.g., turbulence at a connector). A rule-based adaptive learning system monitors the state of the hydraulic system and commands a power conversion device to produce DC power so as to optimize power production and transfer. The power is stored in a storage device and provided to other devices, such as sensors or the like, either wirelessly or via a wired connection.

Hydraulic power is given by Equation 1, $$P=pQ \qquad \text{Equation 1}$$

where P is power typically measured in watts, p is pressure typically measured in Pascals and Q is flow rate typically measured in m³/s, which is the multiplication of displacement and angular flow rate. Therefore, the potential power from a moving fluid is also given by Equation 2:

$$P=\tfrac{1}{2}C_p \rho A v^3 \qquad \text{Equation 2}$$

where P is power typically measured in watts, $C_p$ is power coefficient with a maximum value of 16/27=0.593, ρ is the density of the fluid measured in kg/m³, A is the cross-sectional area the fluid is flowing through measured in m², and v is the velocity of the fluid measured in m/s. A number of systems for power generation from fluid flow in both water and air have been proposed including an "energy harvesting eel" that uses piezoelectric polymers. However, none of these harvesting approaches have been applied to a general pressurized hydraulic system.

Figure 1:
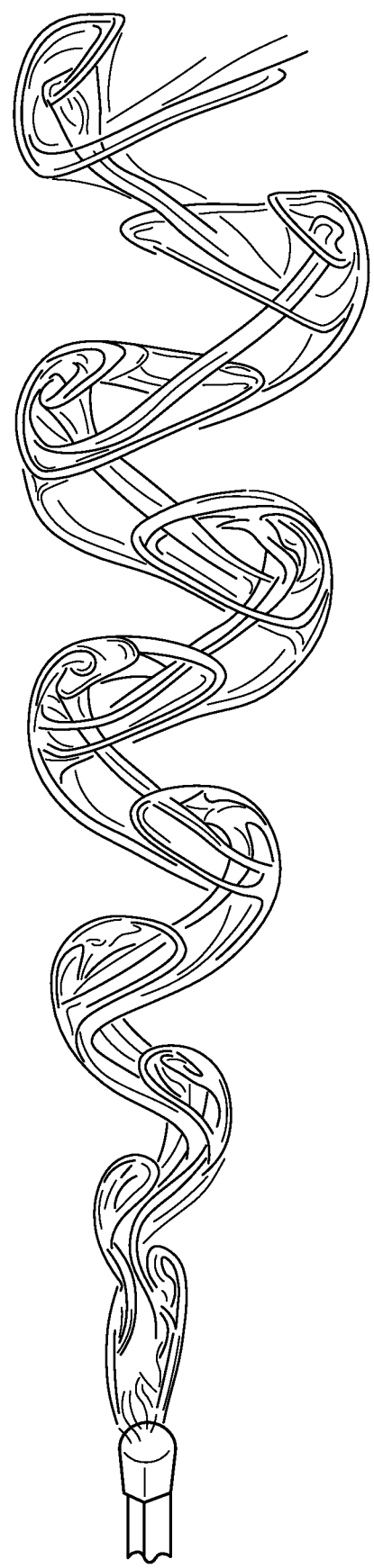
FIG. 1 is an illustration of a von Karman vortex street behind a circular cylinder in air.
Figure 2:
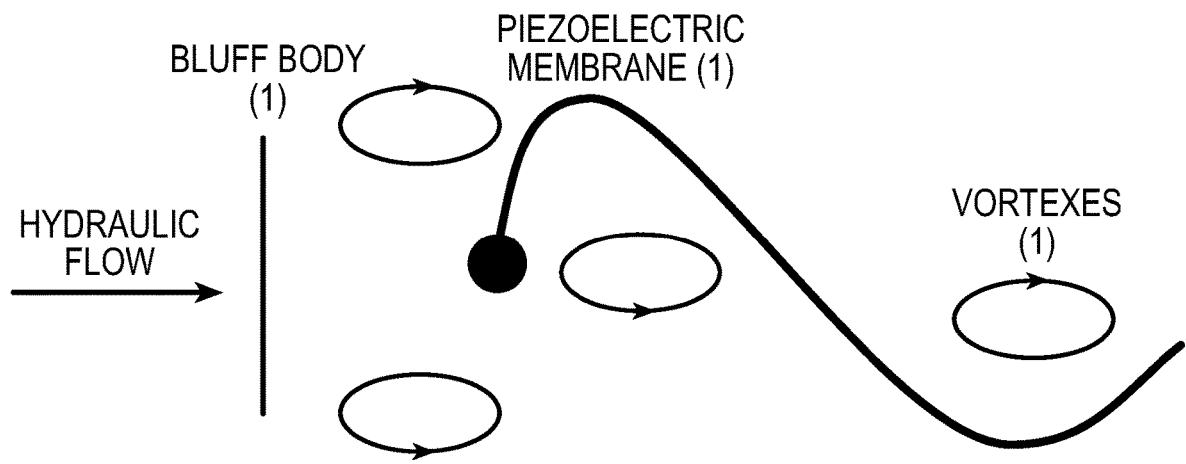
FIG. 2 is a schematic diagram illustrating electric power generation from hydraulic flow via an oscillating piezoelectric membrane.

In one embodiment in accordance with the present invention, a piezoelectric device, such as a piezoelectric membrane, is placed in the wake of a bluff body (e.g., a flat plate) that causes the membrane to oscillate behind the bluff body due to vortex shedding. Vortex shedding is an oscillating flow that takes place when a fluid flows past a bluff body at certain velocities. This repeating pattern of swirling vortices is called von Kármán Vortex Street, which is illustrated in FIG. 1. Use of an oscillating piezoelectric membrane 10 to capture energy from hydraulic flow 12 into a bluff body 14 from a vortex 15 is illustrated schematically in FIG. 2. The piezoelectric membrane 10 then converts the captured energy to electrical energy using piezoelectric effect, and the energy is regulated and stored in an energy storage device for subsequent distribution to other devices.

It is anticipated that 1 m² of piezoelectric membrane should be able to producing 1 watt of electric power. For a typical large hydraulic hose with a diameter of 3" (76 mm), the possible maximum area of the membrane is around 0.006 m² (assuming its typical length is also 3" (76 mm)) and hence the available maximum electric power is 6 mW (assuming an efficiency of 100%). Based on Betz's law and practical applications, the average efficiency is around 20%. Therefore, the maximum electric power output is around 1.2 mW. Since the fluid velocity in a pressurized hydraulic system is slow, the estimated efficiency might be less than 20% and therefore the harvested electric power might be less than 1 mW.

A wireless sensor node typically requires mW power levels and a typical displacement sensor needs 60 mW power levels, although the normal work power might be around 5 mW and, hence, additional power may need to be harvested from power sources.

In addition to vortex shedding, hydraulic pressure ripple or fluctuation in the hydraulic system can be used to harvest power. The pressure ripple present within most hydraulic systems is usually viewed as an annoyance or even a detriment to system performance. However, hydraulic power can be harvested due to the change in pressure.

Assume flow rate Q measured in m³/s is a constant, then the power able to be harvested ΔP measured in watts is as shown in Equation 3:

$$\Delta P = Q \Delta p \qquad \text{Equation 3}$$

where Δp is a pressure drop measured in Pascals.

Figure 3:
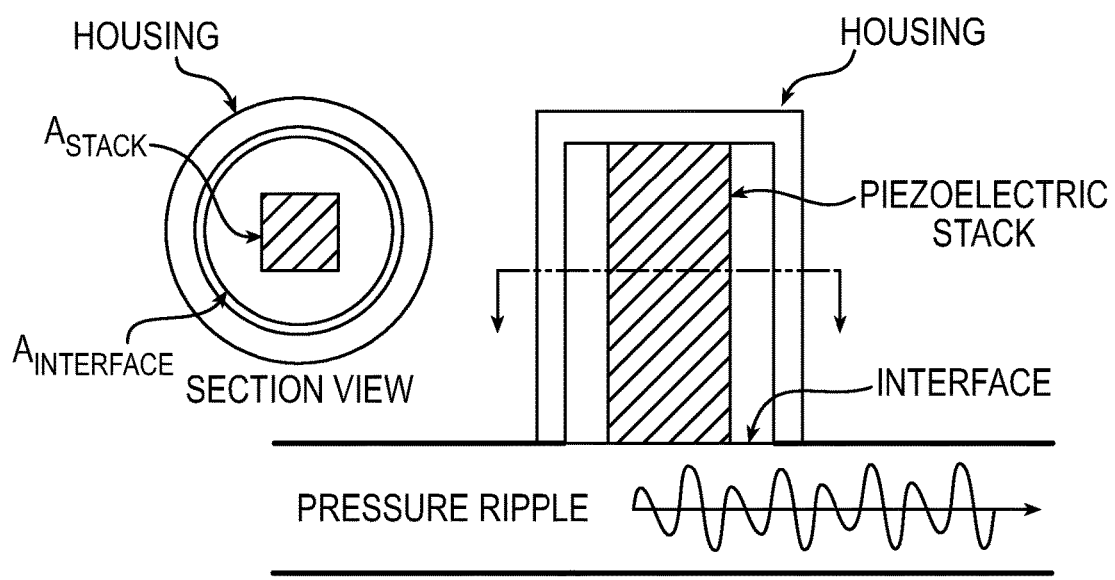
FIG. 3 is schematic diagram illustrating use of a piezo element to generate power from hydraulic pressure ripples.

This approach was mostly applied to gas energy harvesting which generates μW level power. However, hydraulic systems inherently have a high energy intensity associated with the mean pressure and flow. For example, if a hydraulic system has a dynamic pressure amplitude of 100 kPa, then the power intensity level is 450 mW cm⁻². Due to the energy conversion efficiency via a piezoelectric element and pressure ripple amplitude, an initial hydraulic pressure energy harvesting system can provide electric power output of up to 1.2 mW from a dynamic pressure ripple of 400 kPa. FIG. 3 illustrates a schematic pf hydraulic pressure energy harvester. There is further potential to increase the power output level by improving the energy conversion efficiency (which will be discussed below with respect to the adaptive learning system).

Figure 4:
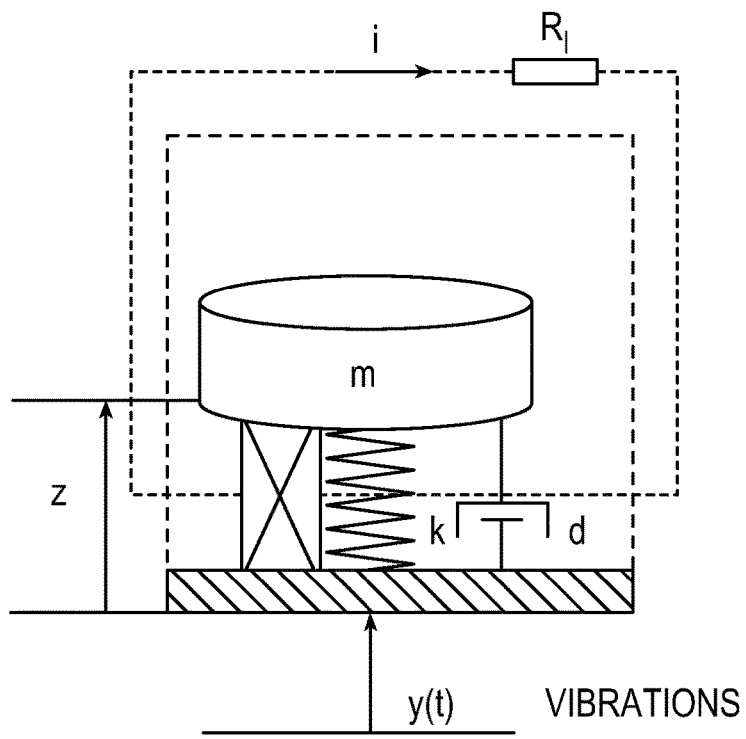
FIG. 4 is a schematic diagram illustrating use of the piezoelectric effect and vibrations to generate electric power.

Yet another means for harvesting power is vibration energy harvesting. Fluid flowing through a connector or a hose causes vibration and hence the mechanical energy from the vibration can be harvested and converted to electrical energy, for example, via a piezoelectric element. The electrical energy can be stored in an energy storage device. FIG. 4 illustrates the basic operating principle where y(t) is the vibration amplitude and i is the current generated from vibration. Power produced by such approach ranges from tens of μW to over one mW. The power can supplement the power generated via vortex shedding and pressure ripple. The electric power output from the piezoelectric elements of each harvesting method can be added and, since a wireless sensor node typically requires mW level power, the total power may be sufficient for a broad range of sensing and communication applications. The power might also be sufficient for displacement, pressure and flow sensors if it can reach tens of mW. The power generated may also be sufficient for CAN-enabled sensors or devices.

Power is equivalent to an amount of energy consumed per unit time. According to the law of conservation of energy, energy can be neither created nor be destroyed, but it transforms from one form to another. At the stage of conversion to electrical energy, there is some energy loss which is dissipated as heat. This involves a conversion efficiency issue. To improve the conversion efficiency and thus the overall efficiency, an adaptive learning technique is introduced to harvest that portion of energy. The basic idea of the adaptive learning technique is to build a learning system or an adaptive controller with a rule-base to implement an optimal energy transfer.

Figure 5A:
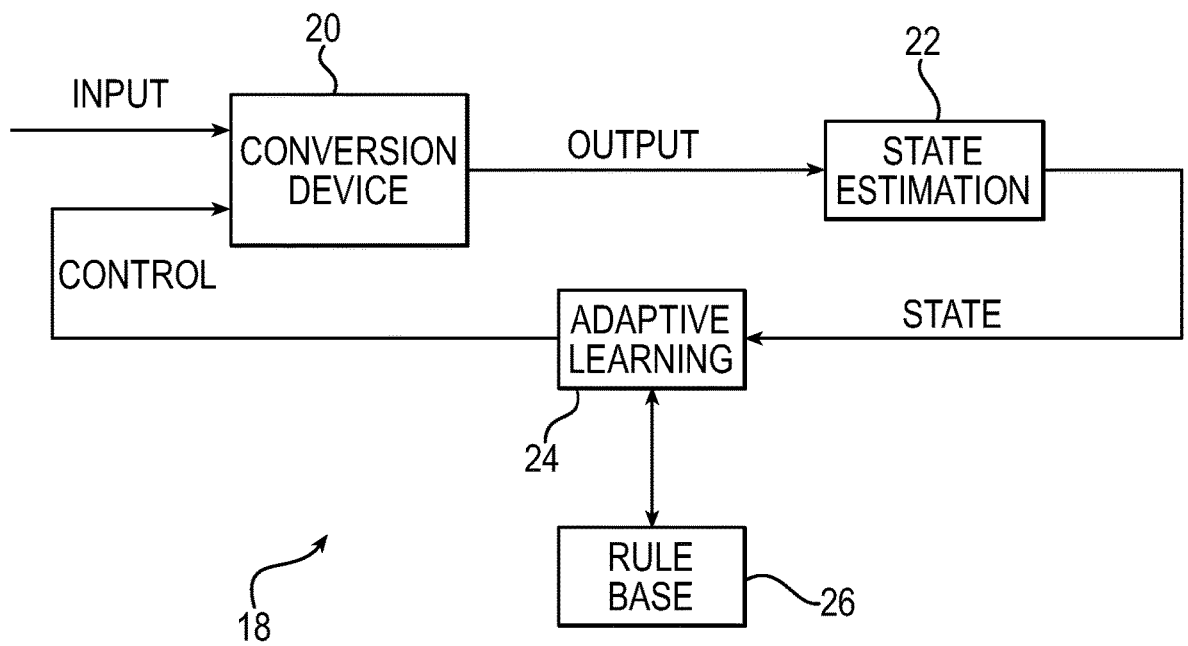
FIG. 5A is a block diagram illustrating an exemplary system for harvesting power in accordance with the present invention.

FIG. 5A shows an exemplary block diagram for a regulation system 18 in accordance with invention. As shown in FIG. 5A, a conversion device 20, such as a power converter that converts AC power to DC power (e.g., a harvesting rectifier), receives power (Input) from the harvesting devices (e.g., piezoelectric devices) in the form of AC power. The conversion device 20 converts the AC power to DC power having a particular voltage and current based on a control command (Control), the DC power being stored in an energy storage device (shown in FIG. 6). The power output by the conversion device 20 (Output) is monitored by a state estimation device 22, which uses state variables of the hydraulic system such as, fluid flow rate and fluid pressure, to estimate a state of the hydraulic system (and thus the potential power that may be produced from the system).

Based on the state of the hydraulic system as estimated by the state estimation device 22, an adaptive learning device 24 determines the optimal power output by the conversion device 20. Since the model dynamics of the hydraulic system are not known and do not need to be known, the adaptive learning device 24 is rule based 26. The inputs to the adaptive learning device 24 are the outcomes from the state estimation device 22 (State). The outputs of the adaptive learning device 24 are the control action to the conversion device 20 (Control). In FIG. 5A, the control variables could be rectified voltage and current, which are setpoints used by the Conversion Device 20 to produce the output voltage and current.

The rules could be stored in either a look-up table or a fuzzy set or other knowledge base rules in the form of Control versus State. The conversion efficiency could be greatly improved by using this adaptive learning device 24. Therefore, the adaptive learning device 24 is beneficial to providing sufficient power to regular hydraulic sensors by improving the energy conversion efficiency.

The system shown in FIG. 5A may be implemented, for example, via a controller or the like. The controller may include a general-purpose processor and a memory, or it may include an application specific integrated circuit (ASIC), which may also include a processor and memory. Logic may be stored in the respective memories and can be executed by the respective processors in order to carry out the method described herein.

Figure 5B:
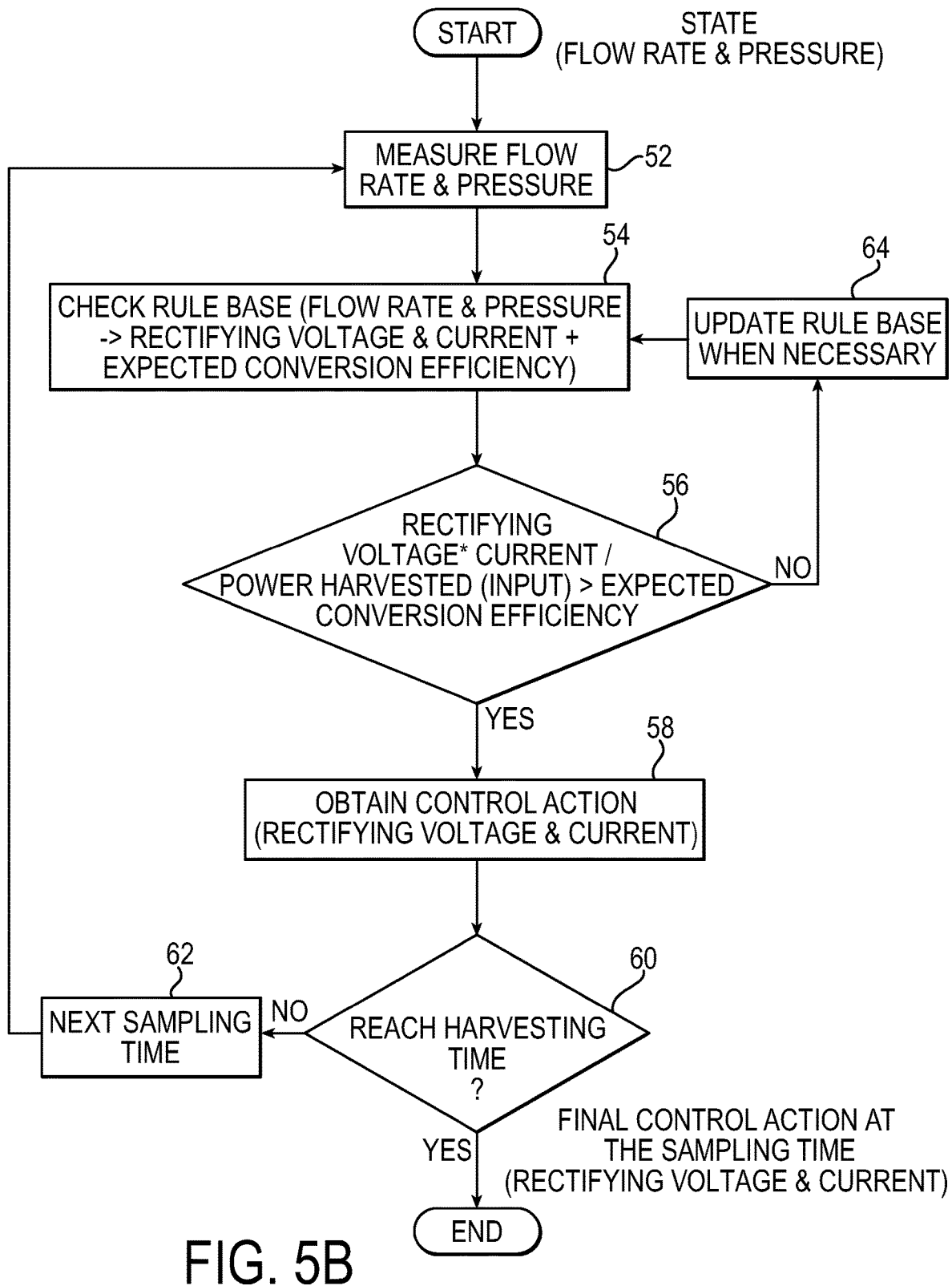
FIG. 5B is a flow diagram illustrating exemplary steps of an adaptive learning method in accordance with the present invention.

FIG. 5B is a flow chart 50 that illustrates exemplary steps carried out by the adaptive learning device 24 in accordance with the invention. The flow chart includes a number of process blocks arranged in a particular order. As should be appreciated, many alternatives and equivalents to the illustrated steps may exist and such alternatives and equivalents are intended to fall with the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

Beginning at step 52, the fluid flow rate and fluid pressure within the hydraulic system are measured, for example, via a flow sensor and pressure sensor. The measured signals may be scaled and filtered as is conventional. Next at step 54 rules are checked based on, for example, the measured flow rate and pressure. In one embodiment, the rules are checked in a conditional if-then format. For example, if flow rate is more than a first prescribed flow value (e.g., 10 gallons per minute) and pressure is more than a first pressure value during a particular sampling time, then a rectified voltage can be expected to be a first voltage level (e.g., 50 mV), a rectified current can be expected to be at a first current level (e.g., 20 mA) and a conversion efficiency can be expected to be at a first efficiency level (e.g., 20 percent). In another embodiment, the rules may be applied based on a database or look-up table. For example, a plurality of different flow rate and pressure combinations may be associated with a respective voltage, current and efficiency values. Then, based on a particular combination of pressure and flow rate, the associated voltage, current and efficiency can be retrieved. While only a single rule is illustrated, it should be appreciated that the device and method in accordance with the invention can employ any number of rules as required by the specific application and different rule base such as a fuzzy inference might be employed.

Next at block 56 if the total expected power divided by the actual harvested power (i.e., the combined power harvested from each piezoelectric element of the system) is greater than the efficiency (0.05*0.02/harvested power>20%), then the method moves to step 58 where a control action is taken at the particular sampling time. Such control action, which may be determined based on the rules obtained at block 54, may include commanding the conversion device 20 to produce an output voltage of 50 mV and an output current of 20 mA. Such commands may be communicated to the conversion device 20 via a communication interface (not shown) as is conventional. The conversion device 20 then proceeds to output a voltage and current at the commanded levels.

Next at step 60 it is determined if a harvesting time period has elapsed. The harvesting time period may be a preset time period in which power harvesting takes place. For example, the harvesting time period may be set 1 second, where during the harvesting time period the harvested energy is stored in a storage device (e.g., a capacitor). Once the time period has elapsed the harvested energy stored in the storage device is provided to a power consumer, e.g., a sensor. For example, the harvested energy may be used as a wireless energy source that can power one or more sensors.

If the harvesting time period has not elapsed, then the method then moves to step 62 where the next sampling time is set and the method moves back to step 52 and repeats. The sampling rate/time may depend on the AC power frequency and system hardware.

Moving back to step 56, if the total expected power divided by the actual harvested power is not greater than or equal to the efficiency, then a rule-based update (in order to obtain as large of a conversion efficiency as possible) may be implemented for the particular sampling time as indicated at step 64. For example, one way to update rule base is that the rectified voltage is increased (e.g., to 100 mV) while the rectified current is maintained at its present level (e.g., 20 mA) and hence the conversion efficiency is increased (e.g., to 25%). The second way to update rule base could be that the rectified current is increased (e.g., to 40 mA) while the rectified voltage is maintained at its present level (e.g., 50 mV) and hence the conversion efficiency is increased to the same value (e.g., to 25%). The third way to update rule base could be that both the rectified voltage and rectified current are increased and hence the conversion efficiency is increased to the same value. Sometimes these updates might be performed using a trial-and-error approach to obtain the optimal or maximum conversion efficiency increase. A good cost function to maximize the conversion efficiency might help update the rule base efficiently. The method then moves to step 54 and repeats using the updated rule.

Figure 6:
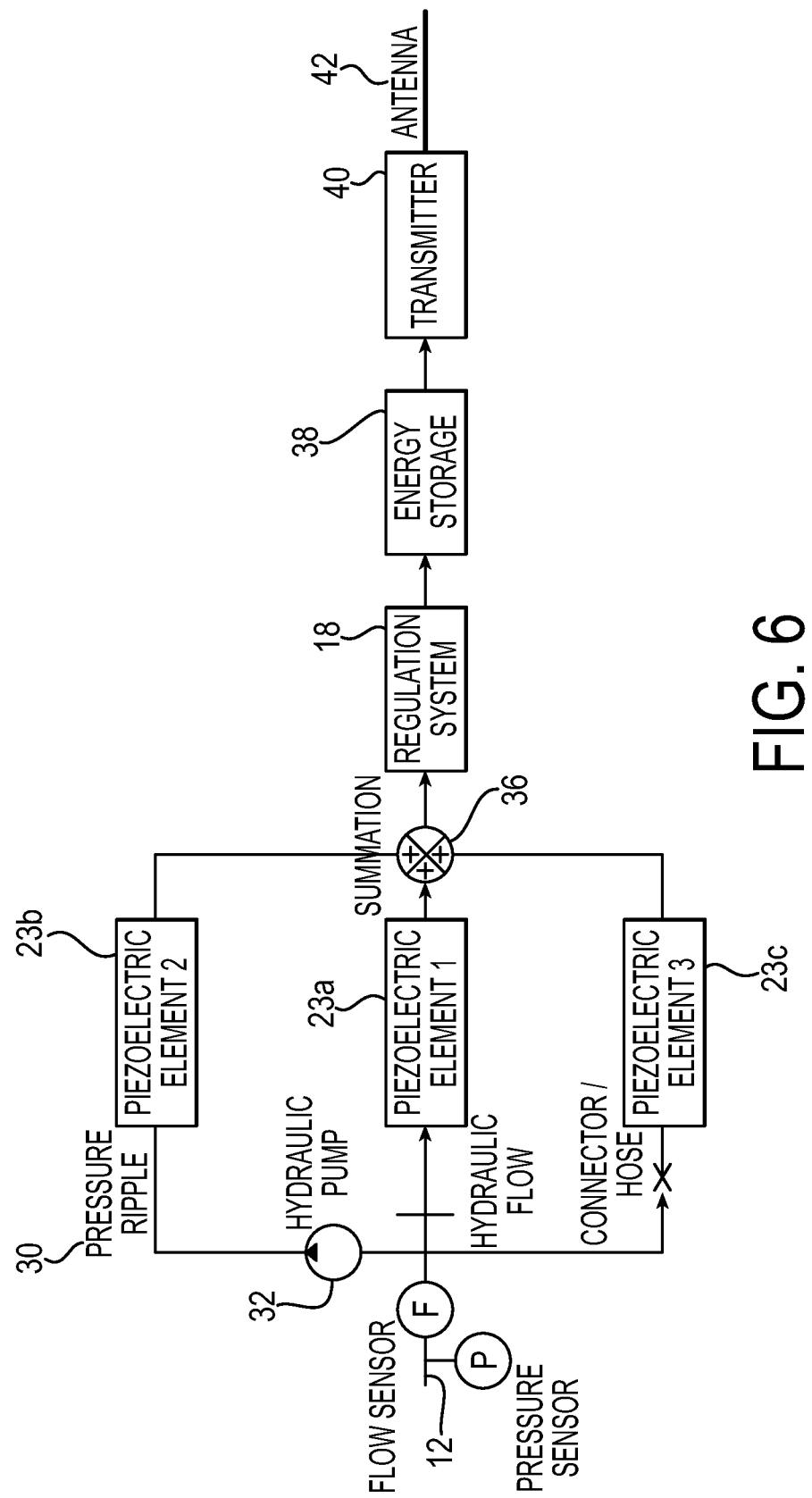
FIG. 6 is a block diagram illustrating power generation using hydraulic flow, pressure ripple and connector/hose via a piezoelectric element.

FIG. 6 illustrates the principle of power generation using hydraulic flow/pressure ripple/connector/hose with a piezoelectric element. A hydraulic flow 12 proceeds through a bluff body 14 and causes piezoelectric element 23a to oscillate due to vortex shedding, and the piezoelectric power is captured and converted to electric power. It is anticipated that 1 $m^2$ of piezoelectric membrane should be able to produce 1 watt of electric power.

Further, a dynamic pressure ripple 30 might be caused by the action of a hydraulic pump or hydraulic valve 32. Electric power can be generated from the pressure ripple 30 through piezoelectric transduction due to the mechanical deflection of a piezoelectric element 23b. The electric power output of the piezoelectric element 23b may be at a level of mW or up to tens of mW.

In addition, the fluid 12 flowing through either a hydraulic connector or hydraulic hose 34 causes vibrations, and the vibration energy can be harvested by using a piezoelectric element 23c. The electric power generated from these three sources is summed via a summation device 36 and then regulated via the regulation system 18. In this way, a maximum electrical energy output can be provided and an optimal energy transfer efficiency can become possible by using the adaptive learning system 24 in accordance with the present invention. The maximum output electrical energy can then be stored in an energy storage device 38, for example, a rechargeable battery or a supercapacitor. The electric power can be transmitted wirelessly to any other electric device through a transmitter 40. It is preferable to use an antenna 42 as a trace in the transmitter 40 to wirelessly transmit radio messages to other devices. However, the antenna 42 is not necessary at this point.

For both mobile and industrial hydraulics, electromagnetic waves exist almost everywhere. For example, radio waves, microwaves, or light waves may be present. As a significant supplement, far-field power can be harvested and electric power can be converted and transferred using power beaming, for example, by aiming the power at a receiver such as an antenna 42 or a photovoltaic cell.

Figure 7:
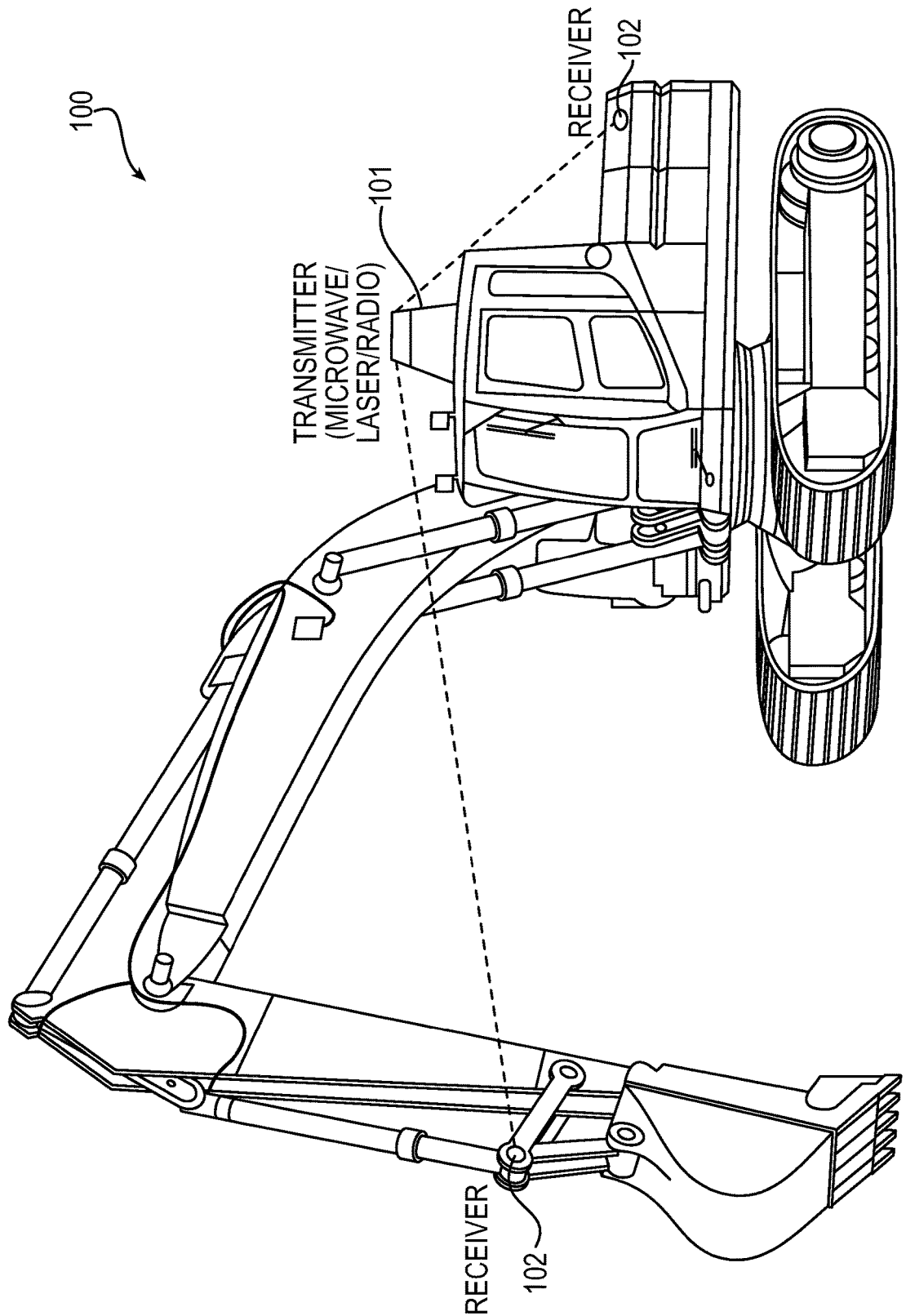
FIG. 7 is a perspective view of an excavator employing power beaming to one or more sensors.

FIG. 7 illustrates how power may be beamed to sensors on an excavator 100. A solar harvester (not shown), for example, with the area of 25 cm$^2$ at 12-15% efficiency, would produce over 300 mW peak of solar power. Far-field or radiative power can be harvested from a longer distance and beamed to other devices via a transmitter 101. For microwave power beaming, a human-safe power density of 1 mW/cm$^2$ distributed across a 10 km diameter area corresponds to 750 mW total power level. Optical power can also beamed at a receiver 102 (photovoltaic cell) that can convert it to electric power. If this portion is added to the above mechanism in FIG. 6, the electric power would be sufficient for displacement, pressure, flow, and temperature sensors in a majority of hydraulic systems as well as wireless sensor nodes and CAN-enabled sensors. In this case, however, a different transduction technique such as a solar cell, an antenna 42 or a photovoltaic cell may be used. Furthermore, the summation 36 should be moved to the location between the adaptive learning device 24 and the energy storage device 38 and hence both the summation 36 and adaptive learning device 24 should be re-designed in order to address the issue of single-source fading due to multiple frequency bands from various electric power supplies generated. This portion is not essential as long as the adaptive learning device 24 gives higher energy conversion efficiency and hence provides efficient electric power up to tens of mW level to the wireless sensors as well as regular hydraulic sensors.

The device and method in accordance with the invention can be used to generate power wirelessly using hydraulic flow, hydraulic pressure fluctuations and hydraulic connector/hose as well as piezoelectric elements. The following are benefits of the device and method in accordance with the invention:

1. By using hydraulic energy source such as hydraulic flow, hydraulic pressure ripples, hydraulic hose, or hydraulic connector via a piezoelectric element, electric power can be generated wirelessly and be transmitted to other electrically powered components, especially to sensors.
2. For any hydraulically powered machines, especially off-highway vehicles, the hydraulic energy source is easily obtained and can be used to generate small-capacity electric power wirelessly with no additional cost.
3. Three piezoelectric elements can be used to generate electric power which is provided to sensors and/or other electric devices. The installation of piezoelectric elements is very easy and incurred cost is almost minimal. It is also possible to find a way to merge three piezoelectric elements into one, and hence the cost can be further reduced.
4. Power beaming can also be used to supplement the electric power supply to wireless, CAN-enabled, and even regular hydraulic sensors The example includes radio wave, microwave, light wave, or even solar radiation.
5. Only one power conditioning circuit can be used to condition the combined output power harvested from three energy sources so as to reduce the power dissipation. Instead of traditional passive rectifier, the power conditioning circuit in accordance with the invention is an adaptive learning system.
6. The adaptive learning system provides an efficient way to improve energy transfer efficiency and a future direction to improve the overall efficiency of piezoelectric energy harvesting.
7. The wireless power generation provides an alternative for the implementation of Internet of Things and a way to harvest hydraulic power.
8. Such energy harvesting technology as hydraulic wireless power generation might eliminate the need for batteries and wires providing power to individual sensors and electric devices. This would reduce maintenance contact and eliminate potential points of failure.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for harvesting electrical power from hydraulic fluid of a hydraulic system, wherein a power conversion device receives input power generated from the hydraulic fluid, the method comprising:
    determining at least one of hydraulic fluid flow or hydraulic fluid pressure in the hydraulic system;
    determining, based on rules and the determined at least one of the hydraulic fluid flow or hydraulic fluid pressure, an expected conversion efficiency of the power conversion device and an expected rectified power to be generated from the input power received by the power conversion device;
    determining from the expected rectified power a potential conversion efficiency of the power conversion device;
    commanding the power conversion device to produce the expected rectified power when the potential conversion efficiency is greater than or equal to the expected conversion efficiency; and updating the rules when the potential conversion efficiency is less than the expected conversion efficiency.

2. The method according to claim 1, wherein updating the rules comprises at least one of changing the expected conversion efficiency of the power conversion device, changing an expected rectified voltage output by the power conversion device, or changing an expected rectified current output by the power conversion device.

3. The method according to claim 1, wherein the potential conversion efficiency comprises a ratio of the potential rectified power and the input power provided to the conversion device.

4. The method according to claim 1, wherein determining the potential rectified power comprises determining an expected rectified current and an expected rectified voltage, and calculating the expected rectified power from the product of the expected rectified current and the expected rectified voltage.

5. The method according to claim 1, further comprising upon a time period over which electrical power is being harvested exceeding a prescribed harvest time threshold, providing the harvested power to another device.

6. The method according to claim 1, further comprising:
determining a harvest time in which power harvesting is active;
continuing power harvesting while the harvest time is less than a prescribed harvest threshold time; and
stopping power harvesting when the harvest time is greater than the prescribed harvest threshold time.

7. The method according to claim 1, further comprising using a piezoelectric element to generate the input power.

8. The method according to claim 7, wherein the input power is generated from at least one of hydraulic fluid pressure variations, hydraulic fluid flow variations, or vibrations caused by hydraulic fluid flow.

9. The method according to claim 1, further comprising wirelessly transmitting the electrical power to another device.

10. The method according to claim 9, wherein the another device comprises at least one sensor.

11. The method according to claim 10, wherein the at least one sensor comprises a displacement sensor, a pressure sensor or a flow sensor.

12. A controller for harvesting electrical power from hydraulic fluid of a hydraulic system, wherein a power conversion device receives input power generated from the hydraulic fluid, the controller comprising:
a processor and memory; and
logic stored in the memory and executable by the processor, the logic including logic configured to determine at least one of hydraulic fluid flow or hydraulic fluid pressure in the hydraulic system;
logic configured to determine, based on rules and the determined at least one of the hydraulic fluid flow or hydraulic fluid pressure, an expected conversion efficiency of the power conversion device and an expected rectified power to be generated from the received input power by the power conversion device;

logic configured to determine from the expected rectified power a potential conversion efficiency of the power conversion device;
logic configured to command the power conversion device to produce the expected rectified power when the potential conversion efficiency is greater than or equal to the expected conversion efficiency; and
logic configured to update the rules when the potential conversion efficiency is less than the expected conversion efficiency.

13. The controller according to claim 12, wherein the logic configured to update the rules comprises logic configured to at least one of change the expected conversion efficiency of the power conversion device, change an expected rectified voltage output by the power conversion device, or change an expected rectified current output by the power conversion device.

14. The controller according to claim 12, wherein the potential conversion efficiency comprises a ratio of the potential rectified power and the input power provided to the conversion device.

15. The controller according to claim 12, wherein the logic configured to determine the potential rectified power comprises logic configured to determine an expected rectified current and an expected rectified voltage, and calculate the expected rectified power from the product of the expected rectified current and the expected rectified voltage.

16. The controller according to claim 12, further comprising logic configured to provide the harvested power to another device upon a time period over which electrical power is being harvested exceeding a prescribed harvest time threshold.

17. The controller according to claim 12, further comprising:
logic configured to determine a harvest time in which power harvesting is active;
logic configured to continue power harvesting while the harvest time is less than a prescribed harvest threshold time; and
logic configured to stop power harvesting when the harvest time is greater than the prescribed harvest threshold time.

18. A system for harvesting electrical power from hydraulic fluid of a hydraulic system, comprising
a power conversion device for converting AC power to DC power;
the controller according to claim 12 operatively coupled to the power conversion device; and
at least one piezoelectric element electrically coupled to the power conversion device and couplable to a hydraulic system, wherein the piezoelectric device generates electric power from fluid flow in the hydraulic system.

19. The system according to claim 18, further comprising at least one sensor configured to receive electric power harvested from the hydraulic system.

\* \* \* \* \*